April 18, 1950 G. C. GILLESPIE 2,504,323
ROLL FILM CAMERA HAVING FILM CONTAINER
MOVABLE ACROSS THE FOCAL PLANE
Filed Jan. 24, 1945 3 Sheets-Sheet 1

INVENTOR.
Glenn C. Gillespie.
BY
Harness, Dickey & Pierce
ATTORNEYS.

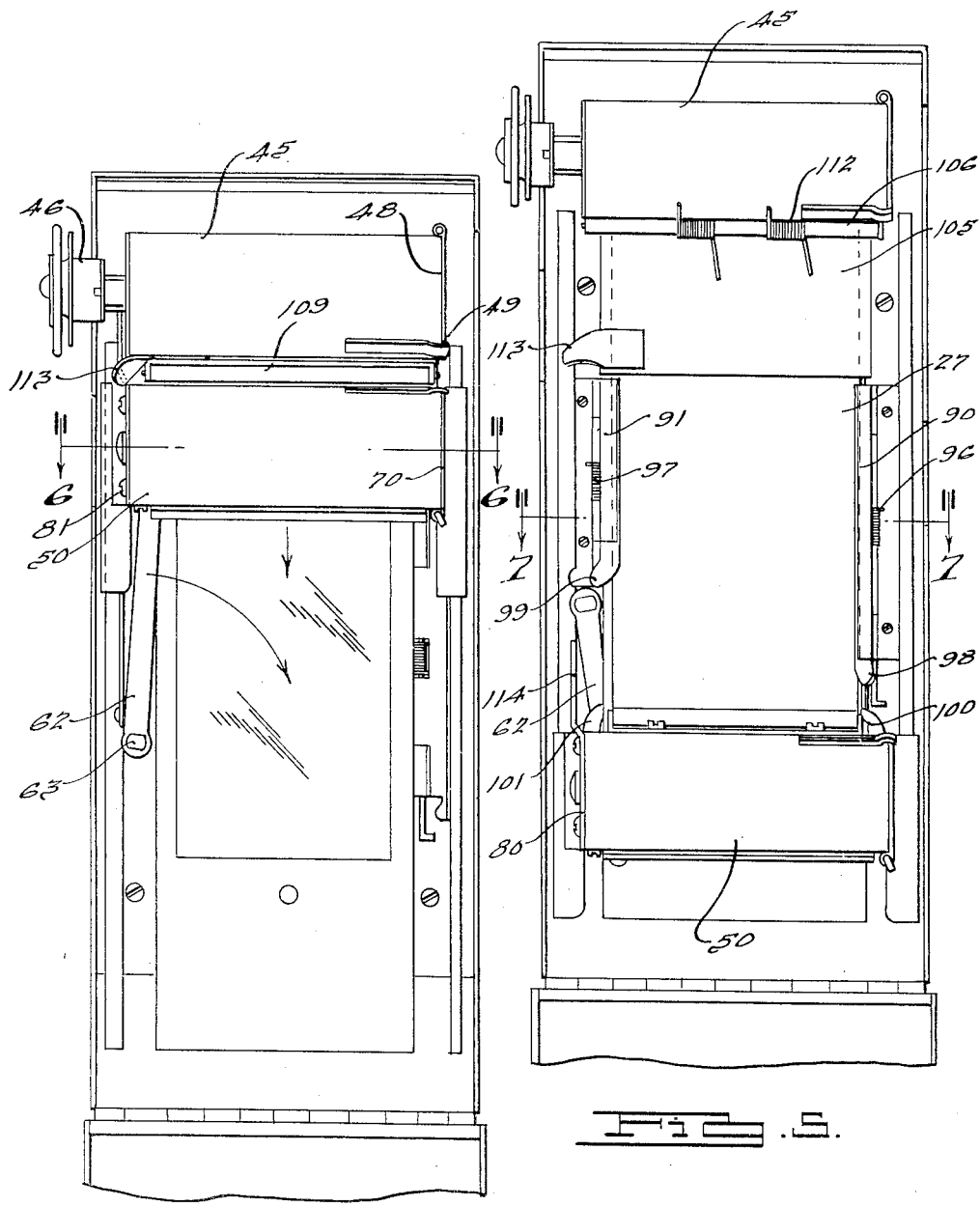

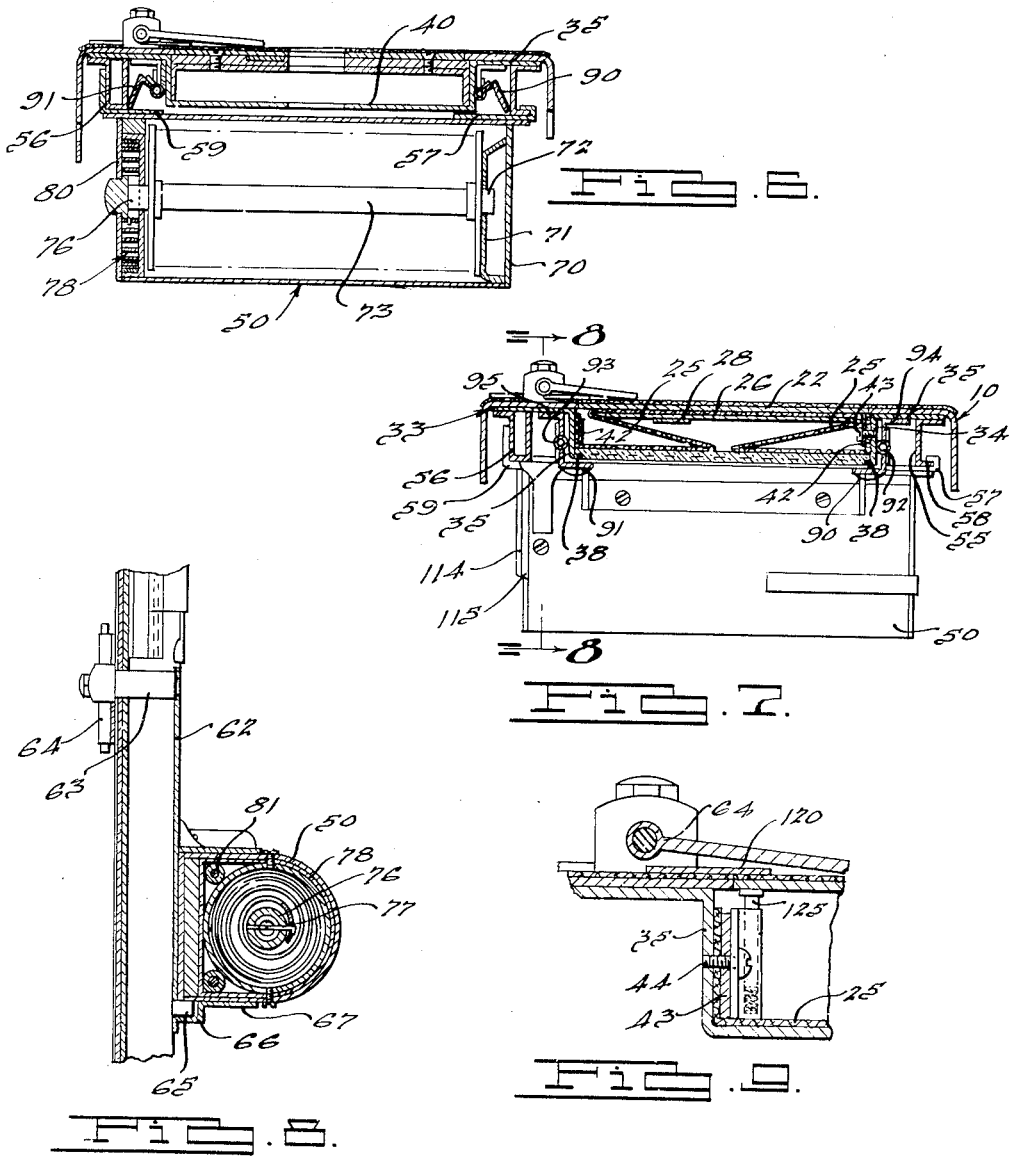

Patented Apr. 18, 1950

2,504,323

UNITED STATES PATENT OFFICE 2,504,323

ROLL-FILM CAMERA HAVING FILM CONTAINER MOVABLE ACROSS THE FOCAL PLANE

Glenn C. Gillespie, Pontiac, Mich.

Application January 24, 1945, Serial No. 574,319

7 Claims. (Cl. 95—31)

The invention relates to photography and it has particular relation to a camera for use in conjunction with roll films.

In certain respects the present invention is related to and constitutes an improvement over the camera disclosed and claimed in Patent No. 1,990,181 issued to me on February 5, 1935. The camera disclosed in that patent in general comprises a casing having a ground glass for focusing purposes and a pair of film receiving spools for progressively advancing the film across the glass. These spools normally are disposed at opposite sides of the glass and one is movable across the glass to a position adjacent the other so as thereby to withdraw the film from the glass. This permits focusing of the image on the glass. Thereafter the movable spool is returned to its original position so that the picture may be taken.

One object of the present invention is to provide an improved and efficient means for shifting the movable spool from one of its positions to the other.

Another object of the invention is to provide a means for moving the spool from one of its positions to the other, which includes a turnable element at the external side of the casing so that the user need only turn the element in one direction or the other to effect the desired movement of the spool.

Another object of the invention is to provide efficient means for moving the spool which holds the latter against accidental movement when it is in either of its positions.

Another object of the invention is to provide an improved means for shielding that portion of the film between the glass and the nonmovable spool, which is automatically shiftable to an out of way position when the movable spool is moved to a position adjacent the nonmovable spool.

Another object of the invention is to provide a means for moving the spool which co-operates with a cover for the ground glass that the cover cannot be opened if the film is disposed over the glass and must be closed before the movable spool can be return after movement to a position adjacent the nonmovable spool.

And, in general, it is an object of the invention to provide an improved camera which can be manufactured less expensively and which is so constructed that it will be easier to operate.

Other objects of the invention will become apparent from the following specification, from the drawings relating thereto, and from the claims hereinafter set forth.

For a better understanding of the invention, reference may be had to the drawings wherein:

Fig. 4 is a front view of the structure shown in Fig. 3;

Fig. 5 is a view like Fig. 4 showing the movable spool returned to its normal position at the opposite side of the glass;

Fig. 6 is a cross-sectional view taken substantially along the line 6—6 of Fig. 4;

Fig. 7 is a cross-sectional view taken substantially along the line 7—7 of Fig. 5;

Fig. 8 is a cross-sectional view taken substantially along the line 8—8 of Fig. 7; and, Fig. 9 is a detail view in cross-section on a larger scale taken substantially along line 9—9 of Fig. 2.

Figure 1:
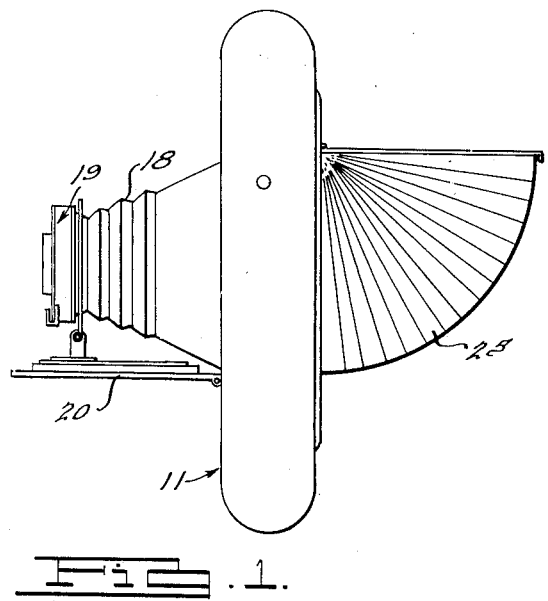
Figure 1 is a side elevational view showing a camera constructed according to one form of the invention.
Figure 3:
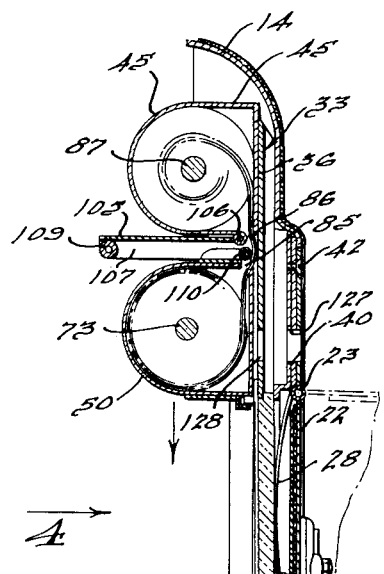
Fig. 3 is a cross-sectional view on a larger scale taken substantially along the line 3—3 of Fig. 2, showing however, only the rear part of the casing with the movable spool in position adjacent the nonmovable spool.
Figure 2:
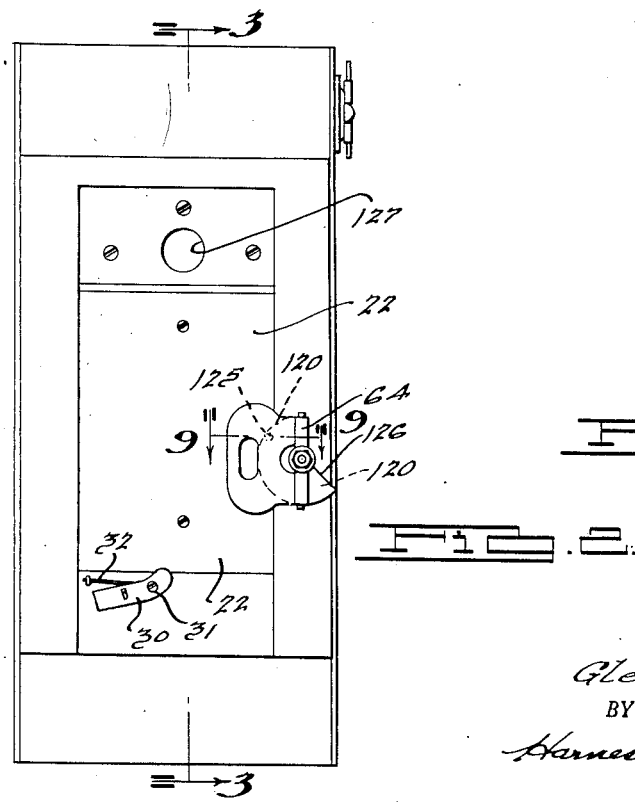
Fig. 2 is a larger view of the camera as seen from the back side thereof with the cover closed.

Referring to Figs. 1, 2, and 3, the casing of the camera comprises a back part 10 and a front part 11, and such parts may be made from sheet metal covered with leather, plastic, or other material, as indicated at 12. As best shown by the latter figure, the ends of the back part 10 are curved as indicated at 14, while along the side edges of the plate, flanges 15 are provided. The two parts of the casing are hingedly connected at one end as indicated at 17 and at the other end they are suitably and releasably latched together. Therefore, upon releasing the latch, the back part 10 may be swung outwardly and away from the remaining part of the casing.

The front part of the casing may have the usual bellows indicated at 18 and provided with an adjustable focusing type of lens 19 at the front end, and the lens mount is carried by a pivotal cover 20 for the front of the casing. Such parts of the camera may be standard and are included here in order to show a focusing type lens by means of which the object to be photographed may be focused on a ground glass carried by the back part 10 of the casing, as presently will be described.

The back part 10 has an opening which is adapted to be exposed or closed by means of a pivoted cover 22 hinged to the plate at one end of the opening as indicated at 23, and this cover, as best shown by Figs. 1 and 7, has a collapsible shroud 25 secured in place on the cover by a plate 26. The opening which is closed by the cover 22 generally registers with a ground glass 27 upon which objects to be photographed may be focused. A spring element 28 secured to the cover and pressing against the glass when the cover is closed acts to spring the cover open partly when the cover is unlatched. Any suitable means may be used for holding the cover in an open position, as shown by Fig. 1. A swingable catch 30, shown by Fig. 2, is pivoted as indicated at 31 on the casing and has an end which is adapted to project over the edge of the cover to hold the latter closed. This latch is normally urged towards cover holding position by a spring 32 and in order to release the cover, the end of the latch is swung against the spring in a clockwise direction.

Now referring to Figs. 3, 6, and 7, a metal frame 33 is fastened to the part 10 of the casing at the inner side thereof and along opposite side edges of the cover 22 this frame has upstanding legs 34 and 35. The outer edges of these legs are connected by a bottom web 36 as shown by Figs. 3 and 6, but this web is cut out substantially in register with the cover 22 as indicated at 37 to provide an opening for the ground glass 27. It will be noted in Figs. 3 and 7 that the edges of the ground glass are rabbeted as indicated at 38 to receive the edges of the web.

As seen in Fig. 3, the glass is held in this opening in web 37 by angular strips 40 and 41 secured by screws 42 to the casing at opposite ends of the glass. From this description it will be seen that the glass is firmly located in opening 37 in the web portion 36 of frame 35. It might be mentioned at this time that the edges of the shroud are connected to the inner sides of legs 34 and 35 of frame 33 by suitable fastening strips 43 and screws 44 shown in Fig. 7.

From the description so far given it should be evident that the cover may be opened and closed and that when opened the ground glass is exposed in order to permit focusing of the object to be photographed on the glass. The remaining description will consider particularly the manner in which the film is disposed across the glass when the picture is to be taken and the manner in which the film is withdrawn to one side of the glass and concealed and shielded during the time focusing of the object to be photographed is to be effected.

Referring now to Figs. 3, 4, and 5, one end of the back part 10 of the casing has a spool housing 45 and this housing is secured to the web 36 of the frame 33. The usual winder 46 extends through one end of the housing 45 and inwardly of the housing, has a key adapted to engage the key slot in the end of the spool. In the usual manner, therefore, the spool within the housing 45 may be turned by rotating the winding device and it is to be understood that the winding device can be turned in only one direction and is locked against reverse rotation. At its opposite end, the housing 45 has a pivoted enclosure 48 normally retained closed by a spring catch 49, and when this cover is closed, the spool of film is concealed within the housing. The cover 48 may have a suitable opening for receiving the end of the spool shaft so that both ends of the spool will be supported.

The second film spool is located in a second housing 50 and this housing is similar in construction to housing 45 but is movable across the ground glass 27. As shown by Figs. 4, 5, and 7, angular metal strips 55 and 56 are secured to the frame 33 along opposite edges thereof, and these strips constitute slideways upon which the movable spool may be reciprocated. The movable spool housing 50 has a hook-shaped strip 57 fastened to its inner side as shown best by Fig. 6, and the hook portion of the strip engages over a flange 58 on strip 55. At its opposite end, the spool housing has an angular strip 59 engaging over the strip 56. These two laterally opposite engagements between the spool housing and slideways 55 and 56 anchor the spool housing solidly against movement excepting reciprocatory movement along the slideways.

As best shown by Fig. 8, the spool housing 50 is adapted to be moved or reciprocated by a swingable arm 62 fastened at one end to a turnable shaft 63 having a winder 64 on its outer end by means of which the shaft may be turned. The opposite end of the arm 62 has a trunnion 65 which projects into a guideway or slot 66 formed by an angular strip 67 fastened to the side of the spool housing. This guideway extends along the edge of the spool housing and when the arm 62 is turned, the trunnion 65 travels along the guideway, and at the same time moves the spool housing lengthwise of the casing.

As will be seen best by Figs. 4 and 5, the spool housing 50 is at the limits of its reciprocation when the arm 62 is substantially parallel to the slideways, and therefore, the arm acts as a lock to prevent movement of the spool housing out of either position when the housing has reached such position. It may be further desirable to provide a shallow notch in the guideway 66 at the end thereof into which the trunnion 65 would ride so as to thereby prevent any loose swinging of the arm 62 from either position. This notch however, would be of such character that the trunnion would ride easily out of the notch when the winder 64 is turned. From this description it is now evident that the spool housing may be shifted or reciprocated across the ground glass, and that it may be positioned adjacent the stationary housing 45 or at the opposite side of the ground glass.

The movable spool housing 50 as best shown by Fig. 6, has a swingable cover 70 closing one end thereof and this cover has an inner cap 71 fastened to it which has a trunnion 72 for engaging the end opening in a film spool 73. This same sort of cover and cap may be used on the stationary spool housing 45 or, in other words, the cover 70 may be constructed in the same manner as the cover 48. The opposite end of the spool housing 50 has a key element 76 which can project into the slotted end of the spool 73 and from this it is to be understood that when the spool 73 rotates, it turns the key 76 with it.

Now as best shown by Fig. 8, the key 76 is secured to one end of a spiral spring 77 which is located in a small auxiliary spring chamber 78 at the end of the spool housing, and the opposite end of the spiral spring has frictional contact with the wall of the spring casing. From this it should be understood that when the spool 73 is rotated it will wind the spring a certain amount and then the spring will slip on the casing wall and therefore, usually the spring will be loaded to a certain extent without, however, providing a continuously increasing spring load. A cover plate 80 shown by Fig. 4, closes the spring end of the spool housing, and this cover may be releasably fastened to the spring casing by screws 81.

Now referring to Fig. 3, a spool of unexposed film 73 is placed in the spool housing 50 and the end of the film is trained through a narrow slot 85 along the edge of the spool housing and then enters the spool housing 45 through a similar slot 86. In the spool housing 45, the film is fastened to an empty spool 87. The two spools may be inserted endwise into the two spool housings by opening the covers mentioned and then when the spools are in place the covers are closed so as to provide bearings for the ends of the spool shafts. It is now evident that if the key for the empty spool 87 is turned, the film will unwind from the spool 73 and that during such unwinding, a certain loading of the spring will occur. Also if the movable housing is shifted to a position at the opposite end of the casing or in other words, from the position in Fig. 4 to the position shown in Fig. 5, the film will unwind across the ground glass and tend to load the spring. With the spool housing in the position shown by Fig. 5, the film may be brought progressively across the ground glass or through the casing so that pictures may be taken in the usual manner. Such operation would wind the spring in the housing 50 but as stated before, the spring would wind only to a certain extent and then would slip so that the spring resistance would not be undesirably great.

If it is desired to use the ground glass for focusing the object to be photographed, the movable spool housing is shifted to a position next to the stationary spool housing, then the cover 22 is opened, and then the lens is adjusted to focus the object on the glass. The cover 22 is then closed and the movable spool is returned to the position shown in Fig. 5, and then the picture may be taken. The initial winding of the spool in housing 45 usually places the spring in spool housing 50 under initial loading and therefore at all times afterwards the spring tends to rewind the film on spool 73. Hence, at any time if the removable spool housing is moved from the position shown in Fig. 5 to the position shown in Fig. 4, the spring acts to wind the film back into spool housing 50.

For holding the edges of the film against the ground glass, pivoted strips 90 and 91 are provided at opposite edges of the ground glass as seen in Figs. 5 and 7, and these strips are hinged as indicated at 92 and 93 to angular strips 94 and 95 fastened to the frame 33 next to the legs 34 and 35. Springs 96 and 97 on the hinges 92 and 93 act to throw the strips 90 and 91 into positions over the ground glass so as to hold the edges of the film against the glass.

For throwing the strips 90 and 91 into out of the way positions when the spool housing 50 is moved across the ground glass from the position shown in Fig. 5, the edges of the two strips are respectively provided with cam-shaped ends 98 and 99, shown best in Fig. 5, which are adapted to be engaged respectively by cam elements 100 and 101 carried by the spool housing 50. Hence, when the spool housing moves, the elements 100 and 101, respectively, swing the strips 90 and 91 into out of the way positions best shown by Fig. 6. This allows the film to be wound into the spool housing 50 without interference from the strips that normally hold the film against the glass.

With the spool housing 50 in the position shown by Fig. 5, a substantial space exists between the glass 27 and the stationary spool housing 45, and the film in this space would be exposed to light if not shielded. In order to shield this portion of the film a pivoted shield or plate 105 is provided and this shield, as best seen in Fig. 3, is hinged as indicated at 106 to the edge of the spool housing 45 adjacent the slot 86 through which the film moves. The shield at opposite edges has short depending flanges 107 which extend over the edges of web 36 on frame 33 so as to prevent light from reaching the film when the shield is in its operative position. A roller 109 at the edge of the shield opposite its hinge 106 holds the film against one end of the glass when the shield is in operative position, and the movable spool housing 50 has a roller 110 located adjacent the slot 85 through which the film extends to hold the film closely against the other end of the glass.

When the movable spool housing moves to the position shown by Fig. 5, the shield 105 is moved downwardly by springs 112 on the hinge 106. The shield is moved to its upright position when the spool housing 50 is shifted, by means of a projection 113 on the housing which is adapted to be engaged by an inclined edge 114 on a flange 115 projecting from the spool housing cover 80. As soon as the shield 105 is raised to a certain extent, the spool housing itself can act to continue swinging movement of the shield until it is in its upright position as seen in Fig. 3. It might be observed at this time that when the movable spool housing 50 moves from its position shown in Fig. 5, and the strips 90 and 91 are swung into out of way positions by the cam elements 100 and 101, the spool housing rides over the strips and holds them in their out of the way positions, as clearly seen in Fig. 6.

It has been stated previously that the two spool housings may be loaded and the film trained through the slots in their lower adjacent edges, when the two housings are in adjacent positions as seen in Fig. 4. It may be found desirable and preferable to be able to load the spool housings in these positions without opening part 10 of the casing. This may be accomplished by providing a suitable cover element on the side edge of the casing which could be opened to expose the covers 48 and 70 so as in turn to permit swinging of these covers through the open side of the casing. This would permit loading of the spools without opening part 10 of the casing.

In order to prevent opening of the cover 22 while the movable housing 50 is across the glass with perhaps unexposed film over the glass, the winder 64 for moving the spool housing may be provided with a disk segment 120 as seen in Figs. 2 and 9 which lies closely over the cover 22 so as to prevent opening of the latter except when the winder is turned to a certain position which will clear the disk with respect to the cover. If the winder 64 is turned through approximately 180° the cover 22 could be opened, but if so turned through 180°, the removable spool housing would be in its position shown in Fig. 4, and in this event no harm could be done by opening the cover 22. At the same time, it is desirable to prevent reverse movement of the housing 50 until the cover is closed, and in order to accomplish this result and as best shown by Figs. 2 and 9, a spring-pressed pin device 125 may be fastened to the leg 35 of the frame and this pin is normally positioned so as to be pressed inwardly by the cover 22 when the latter is closed. However, when the winder 64 is turned to a position permitting opening of the cover and the cover opens, the pin 125 projects outwardly through spring action to a point where the edge 126 of disk segment 120 will strike the pin. Therefore, the winder 64 can not be turned reversely until the pin 125 is pressed inwardly. If the cover 22 now is closed, the pin will be pressed back to its original position and then the winder 64 can be turned so as to move the housing 50 back to its original position.

It may be noted finally that an opening 127 may be provided in the casing part 10 and that this opening registers with an opening 28 in the web 36 of the frame 33. The opening 127 preferably will have a colored glass and the two openings are provided to indicate the frame of film disposed on the ground glass.

From the foregoing it should now be understood that the camera may be used in the ordinary manner and pictures taken without focusing merely by progressively moving the film and taking the pictures according to frames. If focusing is desired, the movable spool is shifted to its position across the ground glass and then the cover is opened exposing the glass. After focusing of the object to be photographed, the cover is closed and then the movable spool housing is returned to its other position. Movement of the movable spool housing across the ground glass to a position adjacent the stationary spool housing automatically winds the film that had been exposed over the glass and then after the focusing operation, the return movement of the spool housing again unwinds the film and places it over the glass. Movement of the spool housing is accomplished easily merely by turning the key on the outside of the casing and therefore operation of the camera in either way is simple and effective.

Although only one form of the invention has been illustrated and described in detail, it will be apparent to those skilled in the art that various modifications may be made without departing from the scope of the claims.

What is claimed is:

1. A camera for use in conjunction with roll film, comprising a casing, a lens on the casing, means in the casing for receiving a sector of unexposed film and locating it substantially in a focal area of the lens, means at opposite sides of said focal area for receiving a spool for unexposed film and a spool upon which the exposed film is to be wound, means for progressively winding the film on the latter spool while the spools are in positions at opposite sides of the focal area so as progressively to move sectors of the unexposed film over said focal area, means including a swingable arm pivoted in the casing for moving one spool to a position adjacent the other and at the same side of the focal area, and a manually turnable element mounted on the outside of the casing and having an operative connection with the arm so that the latter may be swung by turning the element.

2. A camera for use in conjunction with roll film, comprising a casing, fixed means in the casing for receiving a spool for film, a guide in the casing extending to a point adjacent the spool receiving means, a slide movable on said guideway, means on said slide for receiving a second spool, and means including a swingable arm in the casing and a manually turnable element mounted externally of said casing and operably connected to said arm for moving the slide.

3. A camera for use in conjunction with roll film, comprising a casing, a lens on the casing, means in the casing for receiving a sector of unexposed film and locating it substantially in a focal area of the lens, means at opposite sides of said focal area for receiving a spool for unexposed film and a spool upon which the exposed film is to be wound, means for progressively winding the film on the latter spool while the spools are in positions at opposite sides of the focal area so as progressively to move sectors of the unexposed film over said focal area, means mounting one of said spools on said casing for movement across said focal area along a path parallel thereto and including a swingable arm pivoted at one end on the casing for moving said one spool to a position adjacent the other, said arm being substantially aligned with the path of movement of the movable spool when the latter is in either of its positions so as to hold the spool in position until the arm is moved.

4. A camera for use in conjunction with roll film, comprising a casing, a lens on the casing, a pair of spaced spool receiving means in the casing and normally located on opposite sides of a focal area of the lens, a guide in the casing extending along the focal area, means supporting one of said spool receiving means on the guide for movement back and forth across said focal area so that it may be disposed at the opposite or at the same side of the area as the other spool, a swingable arm having one end pivoted on the casing and its other end conneceted to the movable spool receiving means, and means for limiting swinging movement of the arm through approximately a straight angle with the arm substantially aligned with the guide when the movable spool receiving means is in either of its positions.

5. A camera for use in conjunction with roll film, comprising a casing, a lens on the casing, means in the casing for receiving a sector of unexposed film and locating it at substantially in a focal area of the lens, container means at opposite sides of said focal area for respectively receiving a spool for unexposed film and a spool upon which the exposed film is to be wound, means for progressively winding the film on the latter spool while the container means are in positions at opposite sides of the focal area so as progressively to move sectors of the unexposed film over said focal area, a swingable arm in the casing for moving one container means to a position adjacent the other and at the same side of the focal area, means pivoting the arm in the casing including a pivot pin fixed to the arm and projecting outwardly through the casing wall, and means on the exterior end of the pin for manually turning the pin and arm.

6. A camera for use in conjunction with roll film, comprising a casing, a lens on the casing, means in the casing for receiving a sector of unexposed film and locating it substantially in a focal area of the lens, means at opposite sides of said focal area for receiving a spool for unexposed film and a spool upon which the exposed film is to be wound, means for progressively winding the film on the latter spool while the spools are in positions at opposite sides of the focal area so as progressively to move sectors of the unexposed film over said focal area, a glass in said focal area and upon which the image to be photographed may be focused, said casing having an opening registering with the glass, a cover for closing the opening, means for moving one of said spools across said focal area to and from a position in which an image may be focused on said glass, said last named means including a manually turnable element mounted externally of said casing adjacent said cover, a disc on said element shaped to be disposed out of the path of said cover when said one spool is in position for allowing focusing on the glass and to overlie said cover to prevent opening thereof at all other times.

7. A camera for use in conjunction with roll film, comprising a casing, a lens on the casing, means in the casing for receiving a sector of unexposed film and locating it substantially in a focal area of the lens, means at opposite sides of said focal area for receiving a spool for unexposed film and a spool upon which the exposed film is to be wound, means for progressively winding the film on the latter spool while the spools are in positions at opposite sides of the focal area so as progressively to move sectors of the unexposed film over said focal area, a glass in said focal area and upon which the image to be photographed may be focused, said casing having an opening registering with the glass, a cover for closing the opening, means for moving one of said spools across said focal area to and from a position in which an image may be focused on said glass, said last named means including a manually turnable element mounted externally of said casing adjacent said cover, a disc on said element shaped to be disposed out of the path of said cover when said one spool is in position for allowing focusing on the glass and to overlie said cover to prevent opening thereof at all other times, and a pin mounted on said casing in the path of the cover and adapted to project into the path of said disc when said cover is open for preventing actuation of said manually turnable element.

GLENN C. GILLESPIE.

REFERENCES CITED

The following references are of record in the file of this patent:

UNITED STATES PATENTS

| Number | Name | Date |
| --- | --- | --- |
| 723,401 | Moh | Mar. 24, 1903 |
| 1,031,023 | Peters | July 2, 1912 |
| 1,232,125 | Trippel | July 3, 1917 |
| 1,705,027 | Peters | Mar. 12, 1929 |
| 1,947,483 | Mihalyi | Feb. 20, 1934 |
| 1,990,181 | Gillespie | Feb. 5, 1935 |
| 2,111,425 | Goldhammer | Mar. 15, 1938 |
| 2,233,006 | Goldhammer | Feb. 25, 1941 |